Figure 1:
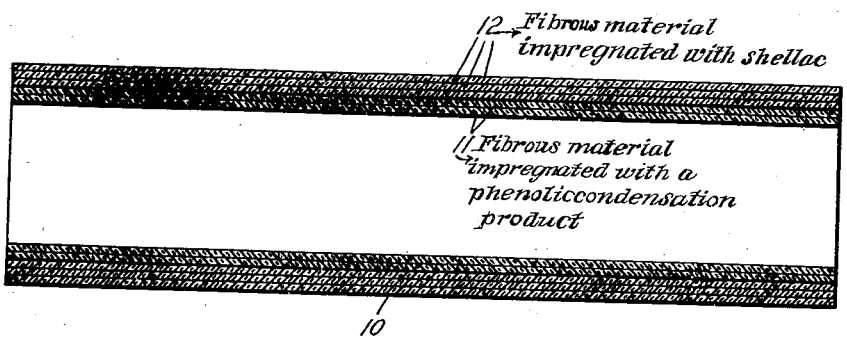

L. T. FREDERICK.
INSULATING MATERIAL AND PROCESS OF MAKING THE SAME.
APPLICATION FILED NOV. 12, 1915.

1,284,295.

Patented Nov. 12, 1918.

WITNESSES:

INVENTOR
Louis T. Frederick
BY
ATTORNEY

UNITED STATES PATENT OFFICE.

LOUIS T. FREDERICK, OF WILKINSBURG, PENNSYLVANIA, ASSIGNOR TO WESTINGHOUSE ELECTRIC AND MANUFACTURING COMPANY, A CORPORATION OF PENNSYLVANIA.

INSULATING MATERIAL AND PROCESS OF MAKING THE SAME.

1,284,295.  Specification of Letters Patent.  Patented Nov. 12, 1918.

Application filed November 12, 1915. Serial No. 61,077.

*To all whom it may concern:*

Be it known that I, LOUIS T. FREDERICK, a citizen of the United States, and a resident of Wilkinsburg, in the county of Allegheny and State of Pennsylvania, have invented a new and useful Improvement in Insulating Materials and Processes of Making the Same, of which the following is a specification.

My invention relates to laminated materials for use as electrical insulation and the like, and it has for its object to provide a composite laminated material which shall possess great mechanical strength combined with a high degree of dielectric strength.

In the manufacture of sheets and tubes for use in electrical insulation, it is common to coat or impregnate power or other fibrous sheet material with a suitable adhesive and to superpose layers of such treated material one upon the other, the laminations being thereafter compacted by means of heat and pressure. For this purpose, it is common to employ an adhesive containing a condensation product of phenols and formaldehyde and the resulting product is an effective insulating material and also possesses relatively great tensile strength.

I have discovered that the dielectric strength of materials of the above indicated class may be substantially increased by impregnating certain of the laminations composing the structure with a condensation product of phenols and formaldehyde and by impregnating certain others of the laminations with another adhesive having a higher dielectric strength, and combining the differently impregnated laminations into a single structure. The adhesive having the higher dielectric strength need not possess as great mechanical strength as the phenolic condensation product, since the laminations impregnated with the condensation product afford sufficient rigidity to sustain the entire structure.

I find it advantageous to use, as the adhesive of greater dielectric strength, either shellac dissolved in a suitable solvent or other varnishes containing substantial proportions of shellac. It is to be understood, however, that my invention is not restricted to the use of these substances, which are mentioned only by way of illustration.

In applying my present invention to the manufacture of insulating tubes, I may proceed by rolling upon a mandrel a few turns of paper treated with a fusible condensation product that may be hardened by the application of heat and pressure. Over these first turns, I wind paper treated with shellac varnish until sufficient material is wound upon the mandrel to form a tube of the required thickness. The tube and the mandrel are then placed in a heating oven, preferably provided with means for maintaining superatmospheric pressure, and sufficient heat is applied to transform the phenolic condensation product into its final infusible and insoluble condition. I find that the heat treatment just described operates to substantially raise the softening point of the shellac. In order to obtain this result, the heat should be applied gradually and should not be permitted to exceed about 120° C., as there is danger of destroying the adhesiveness of the shellac if the temperature is too high and, particularly, if the temperature is quickly raised. However, if the heat is applied very gradually, it is possible to raise the temperature even as high as 140° C. or 150° C. A satisfactory working range of temperatures is between 90° C. and 120° C.

As indicated above, the shellac varnish to be used in my present process may consist simply of shellac dissolved in methyl alcohol or other suitable solvent, or it may consist of a varnish containing both shellac and other varnish gums. Such a suitable varnish may be made by mixing about 1½ pounds of copal gum, 3 pounds of orange shellac and 1 ounce of castor oil or alpha naphthol and taking up the mixture with about 1 gallon of methyl alcohol.

Figure 2:
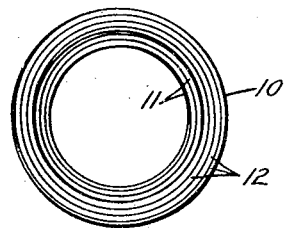

In the drawings in which Figure 1 is a diametric sectional view and Fig. 2 an end elevation, I have illustrated a tube constructed in accordance with my invention. This tube 10 includes a plurality of inner layers 11 of paper treated with a phenolic condensation product and a plurality of outer layers 12 of paper treated with shellac varnish.

When tubes, sheets or other structures are made according to the process described above, the phenolic condensation product or other strong adhesive serves to stiffen the entire structure, and the adhesive having greater dielectric strength but less mechanical strength serves to raise the effective dielectric strength of the whole structure without seriously affecting its mechanical properties. The products of my process are also much less costly than similar products that employ only phenolic condensation products as binders, since the cost of shellac varnish is much less than that of the commercial condensation products.

When a condensation product of phenols and formaldehyde is referred to in the appended claims, this expression is intended to include not only condensation products made from phenol and formaldehyde but also condensation products that result from the interaction of homologues and polymers of these substances. For my present purpose, any substance is equivalent to formaldehyde which contains replaceable methylene groups or which engenders such a substance in the course of the condensing reaction with phenolic material.

It is to be understood that the several materials and manipulations described above may be variously modified by persons skilled in the art without exceeding the limits of my invention and that no limitations are to be imposed upon my invention except such as are indicated in the appended claims.

I claim as my invention:

1. A composite electrical insulating material comprising fibrous material, an adhesive having relatively great mechanical strength and another adhesive having less mechanical strength and greater dielectric strength than the said first-named adhesive.

2. A composite electrical insulating material comprising fibrous material, a condensation product of phenols and formaldehyde, and an adhesive having a higher dielectric strength than the said condensation product.

3. An electrical insulating material comprising superposed laminations of fibrous material cemented together by means of adhesives, the adhesive associated with certain of the said laminations having less mechanical strength but greater dielectric strength than the adhesive associated with other laminations.

4. A composite electrical insulating material comprising superposed laminations of sheet material cemented together by means of adhesives, the adhesive associated with certain of the said laminations containing shellac and the adhesive associated with other laminations containing a condensation product of phenols and formaldehyde.

5. A composite tube comprising concentrically wound laminations of fibrous sheet material cemented together by means of adhesives, the adhesive associated with certain of the said laminations having greater mechanical strength than the adhesive associated with other laminations.

6. A composite tube comprising concentrically wound laminations of fibrous sheet material cemented together by means of adhesives, the adhesive associated with the outermost laminations having less mechanical strength but greater dielectric strength than the adhesive associated with the innermost laminations.

7. A composite tube comprising concentrically wound laminations of fibrous sheet material cemented together by means of adhesives, the adhesive associated with certain of the said sheets containing a condensation product of phenols and formaldehyde, and the adhesive associated with certain other sheets having a higher dielectric strength than the said condensation product.

8. A composite tube comprising concentrically wound laminations of fibrous sheet material cemented together by means of adhesives, the adhesive associated with the outermost laminations containing shellac, and the adhesive associated with the innermost laminations containing a condensation product of phenols and formaldehyde.

9. A composite insulating material comprising substantially pure shellac which has been heated under the conditions described to give it a higher softening point than normal shellac.

10. A composite body comprising superimposed laminations of fibrous sheet material cemented together by substantially pure shellac which has been heated under the conditions described to give it a higher softening point than normal shellac.

11. The process of making composite material containing substantially pure shellac that comprises subjecting the said material to sufficient heat under the conditions described to raise the softening point of the shellac.

12. The process of making insulating tubes that comprises winding upon a mandrel a plurality of turns of sheet material treated with a phenolic condensation product, superposing thereon a plurality of turns of sheet material treated with an adhesive of greater dielectric strength than the said phenolic condensation product, and baking the assembled sheet material.

13. The process of making insulating tubes that comprises winding upon a mandrel a plurality of turns of sheet material treated with a phenolic condensation product, superposing thereon a plurality of turns of sheet material treated with a shellac-containing varnish, and heating the assembled sheet material to at least 90° C.

In testimony whereof, I have hereunto subscribed my name this 26th day of Oct. 1915.

LOUIS T. FREDERICK.